United States Patent
Xu et al.

(10) Patent No.: US 7,460,276 B2
(45) Date of Patent: Dec. 2, 2008

(54) SYSTEMS AND METHODS FOR RANK-ORDER ERROR DIFFUSION IMAGE PROCESSING

(75) Inventors: Beilei Xu, Penfield, NY (US); David Jordan Lieberman, Fairport, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 873 days.

(21) Appl. No.: 11/013,787

(22) Filed: Dec. 17, 2004

(65) Prior Publication Data

US 2006/0132847 A1 Jun. 22, 2006

(51) Int. Cl.
*H04N 1/405* (2006.01)
*G06K 15/00* (2006.01)
(52) U.S. Cl. .................... 358/3.06; 358/3.01
(58) Field of Classification Search ............ 358/1.9, 358/3.01, 3.03, 3.04, 3.05, 3.06, 3.09, 3.12, 358/3.21; 382/252
See application file for complete search history.

(56) References Cited

U.S. PATENT DOCUMENTS

| | | | |
|---|---|---|---|
| 4,868,587 A | 9/1989 | Loce et al. | |
| 5,208,871 A | 5/1993 | Eschbach | |
| 6,347,159 B1 | 2/2002 | Williams et al. | |
| 6,563,957 B1 * | 5/2003 | Li et al. | 382/252 |
| 6,608,701 B1 * | 8/2003 | Loce et al. | 358/3.09 |
| 6,717,700 B1 | 4/2004 | Sanderson | |
| 2003/0090729 A1 * | 5/2003 | Loce et al. | 358/3.06 |
| 2003/0218780 A1 | 11/2003 | Braun et al. | |
| 2004/0032600 A1 | 2/2004 | Burns et al. | |

* cited by examiner

*Primary Examiner*—James A Thompson
(74) *Attorney, Agent, or Firm*—Oliff & Berridge, PLC

(57) ABSTRACT

One aspect of the invention provides a method of halftoning an image which involves determining a quantization error for a selected target pixel of an image, selecting a diffusion mask, the mask relating to the target pixel and pixels neighboring thereto, receiving a first pair of neighboring pixel values for a first pixel pair including a first neighboring pixel and a second neighboring pixel, and receiving a second pair of neighboring pixel values for a second pixel pair including a third neighboring pixel and a fourth neighboring pixel. The method further involves determining a ranking order of the first, second, third and fourth neighboring pixels by comparing pixel values of the first, second, third and fourth neighboring pixels, and diffusing error to at least one of the first, second, third and fourth neighboring pixels based on the determined ranking order of the first, second, third and fourth neighboring pixels.

21 Claims, 13 Drawing Sheets

FIG. 12
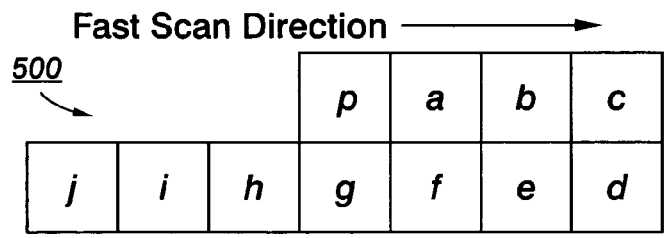
FIG. 13
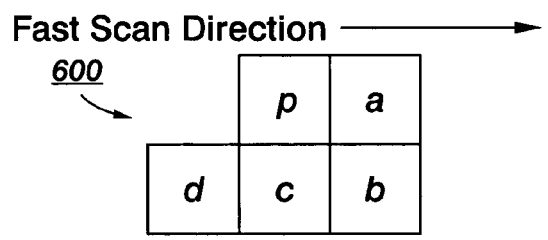
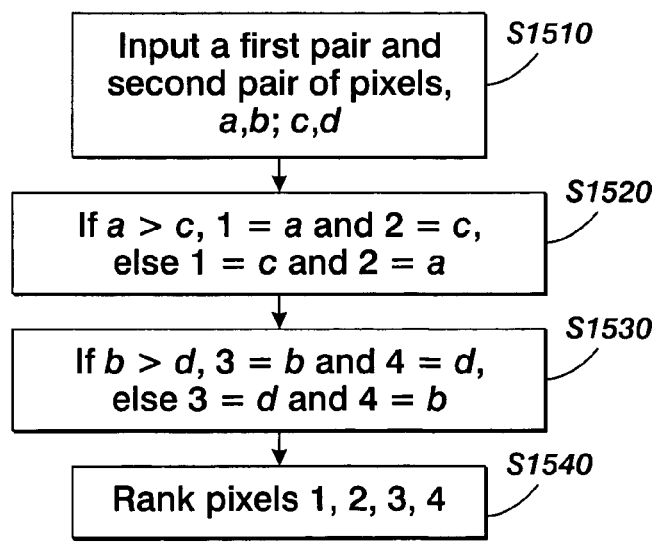
FIG. 14

SYSTEMS AND METHODS FOR RANK-ORDER ERROR DIFFUSION IMAGE PROCESSING

BACKGROUND

Systems and methods for rank-order error diffusion for rendering a digital image are described herein. Halftone images that are received (e.g., scanned) by an image processing system can employ systems and methods with one or more of the features described herein for further processing and/or copying of the image. However, the systems and methods described herein may also be beneficially employed, all or in part, in the processing of images from other sources, including but not limited to, Adobe gray tile, JPEG uncompressed images, scanned line art and anti-aliased images. (Adobe is a registered trademark of Adobe Systems Incorporated.)

Binary halftone images consist of a multitude of tiny marked spots on an unmarked background. The spots are laid out in a grid. For example, the spots are laid out with the structure of a halftone screen. When a halftone image is scanned, for example, during a copying procedure, it is highly unlikely that the locations of marked and unmarked portions of the image exactly coincide with the locations of sensors in the scanning device. Therefore, a marked spot may only be partially in the field of view of a related image sensor. For this and other reasons, such as, limited resolution, edge noise and scatter from prior printing, scanned halftone images tend to include gray edges around the halftone spots or dots. To print such grayed halftones, or grayed halftones from other sources, it is necessary to convert the gray level values of the scanned image into a binary (mark or unmark) form or to correct or remove them.

Several methods for converting grayed images into a binary form are known. For example, images such as these are binarized through thresholding, re-halftoning, and through a variety of error diffusion techniques.

Problems exist with each of these known methods. For example, simple thresholding removes all intermediate gray levels and therefore can introduce an unacceptably large gray error. In re-halftoning, the frequency components of the new halftone screen can combine undesirably with a halftone grid pattern of the original or scanned image to produce objectionable moiré patterns. Conventional error diffusion can usually render a scanned halftone without pattern artifacts. However, conventional error diffusion techniques often produce images with excessive fragmentation of dots. In at least some environments, such as, for example, some xerographic environments, dot or spot fragmentation is to be avoided. Compact dots are more forgiving of non-linearities and process drifts associated with reprographic devices than are tiny dot fragments associated with a diffuse fragmentary dot. For example, a small dimensional offset in the size of a tiny dot fragment represents a larger dot gain error than does the same dimensional offset applied to a large compact dot. Dot gain errors are perceived as errors in lightness or darkness of an image or portions of an image.

The problems of the prior art binarization methods are best illustrated in FIG. 1-FIG. 6.

Figure 1:
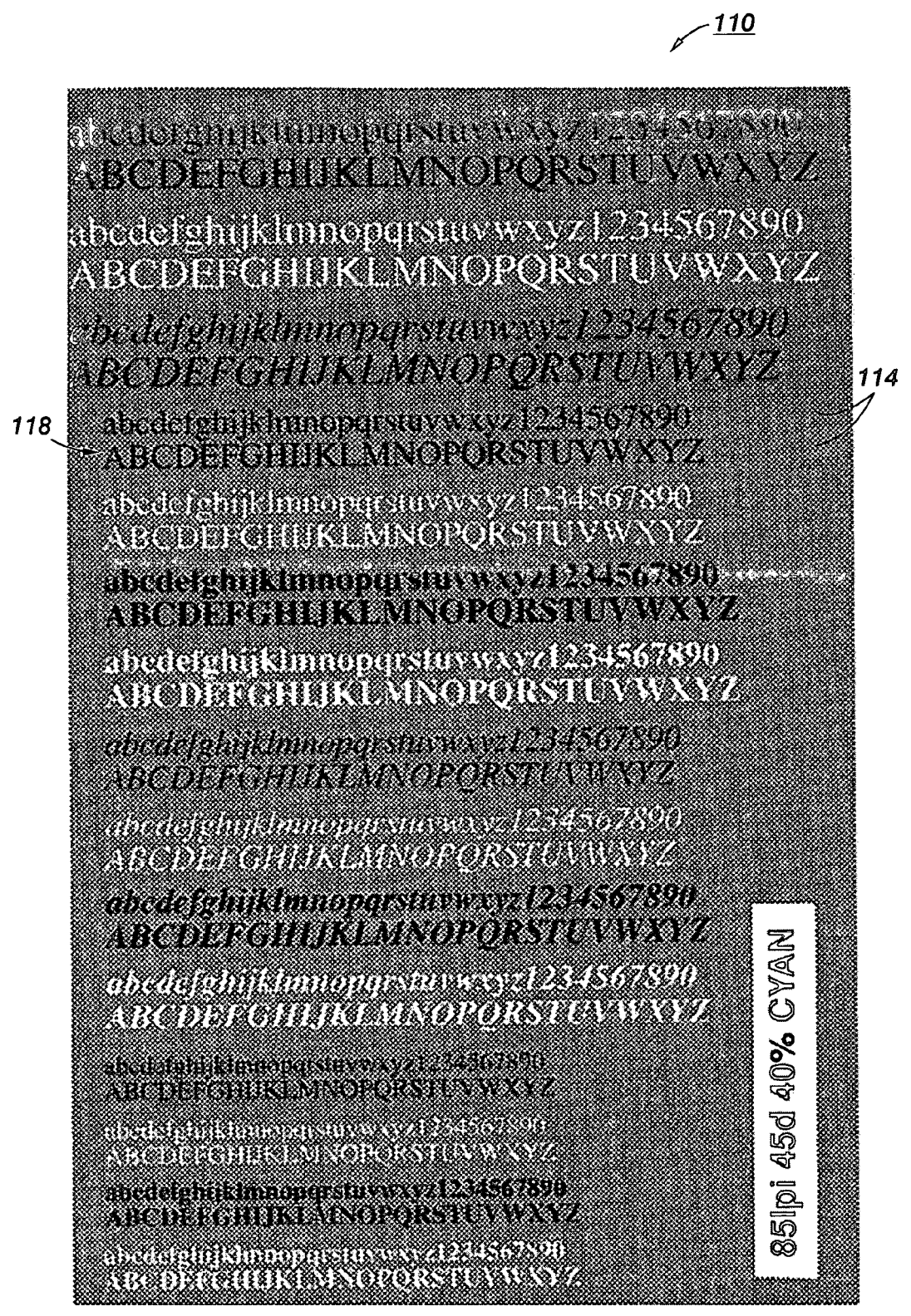

FIG. 1 represents an original halftoned image that has been scanned into an image processing system resulting in a scanned image 110. The original halftone was made with an eighty-five line per inch, forty-five degree dot screen. That screen beat against a grid pattern of the scanning device. The scanning device grid results from a layout of scanner sensors and a sampling frequency of the scanners. As a result, the scanned image 110 includes a subtle checkerboard moiré pattern 114. Additionally, referring to FIG. 2, (which is a magnified view 210 of a portion 118 of the scanned image of FIG. 1) due to a lack of correlation between the location of original image dots and the location and layout of scanner sensors (among other things), the dots of the scanned image have gray edges 214, where the original image was made up of high contrast black dots on a white background. Referring to FIG. 3 and FIG. 4, simple thresholding can be used to remove the gray edges and maintain dot compactness, as is evident in a magnified view 310 of a portion 410 of a thresholded version 414 of the scanned image 110. However, thresholding has the adverse effect of improving the contrast of the subtle moiré pattern 114 thereby generating a clearer and more distinct moiré pattern 418 in the thresholded version 414.

Re-halftoning also maintains dot compactness. However, as will be understood by those of skill in the art, re-halftoning introduces additional moiré effects.

Referring to FIG. 5 and FIG. 6, known error-diffusion techniques such as, for example, Floyd-Steinberg error-diffusion yield an error-diffusion version 510 of the scanned image 110. The error-diffusion version 510 is relatively moiré free. Not only does Floyd-Steinberg error-diffusion not add patterning artifacts to the image, it also reduces the effect of moiré that were present in the scanned image 110. However, as is apparent in a magnified view 610 of a portion 614 of the error-diffusion version 510, error-diffusion introduces dot fragmentation 618 into the image. This dot fragmentation tends to give the image a noisy appearance. Additionally, as explained above, dot fragmentation increases the susceptibility of the image to spatial non-uniformity, temporal instability and dot gain errors of, for example, a rendering device.

Due to the above described problems and limitations of prior art binarization or quantization reduction methods, there has been a desire for a binarization or quantization reduction method that improves or maintains dot compactness while at the same time eliminating, reducing or not contributing to the presence of patterning artifacts in a reduced quantization version of a grayed halftone image or other gray edged images, such as, for example, Adobe gray tile, JPEG uncompressed images, scanned line art and anti-aliased images.

SUMMARY

To that end, an improved method of preparing an image for rendering on a reduced quantization level device has been developed.

A method of halftoning an image which involves determining a quantization error for a selected target pixel of an image, selecting a diffusion mask, the mask relating to the target pixel and pixels neighboring thereto, receiving a first pair of neighboring pixel values for a first pixel pair including a first neighboring pixel and a second neighboring pixel, and receiving a second pair of neighboring pixel values for a second pixel pair including a third neighboring pixel and a fourth neighboring pixel is provided. The method further involves determining a ranking order of the first, second, third and fourth neighboring pixels by comparing pixel values of the first, second, third and fourth neighboring pixels, and diffusing error to at least one of the first, second, third and fourth neighboring pixels based on the determined ranking order of the first, second, third and fourth neighboring pixels.

A halftoning apparatus including an image receiving unit; and a rank-order error diffusion processing unit. The rank-order error diffusion processing unit receiving a grayed halftone image from the image receiving unit and processing the receiving grayed halftone image to output an output a renderable version of the received grayed halftone image which has been subjected to rank-order error diffusion, wherein the rank-order error diffusion unit resamples the received grayed image to a processing resolution if an input resolution of the received grayed image and a processing resolution are not same, the processing resolution being a resolution at which the received grayed image is subjected to processing by the rank-order error diffusion processing unit.

A method of halftoning an image is provided which involves receiving the image, the received image being at an input resolution, resampling the image to a processing resolution if the input resolution and the processing resolution are not same, processing the image using rank-ordered error diffuision, and resampling the processed image to a desired output resolution for the image if the processing resolution and the output resolution are not same.

Still other advantages of the exemplary systems and methods described herein will become apparent to those skilled in the art upon a reading and understanding of the detail description below.

BRIEF DESCRIPTION OF THE DRAWINGS

Systems and methods employing one or more of the features described herein may take form in various components and arrangements of components, and in various procedures and arrangements of procedures. The drawings are only for purposes of illustrating exemplary embodiments, they are not to scale, and are not to be construed as limiting the features they illustrate to the exemplary embodiments illustrated.

FIG. 1 illustrates a scanned halftone image;

Figure 3:
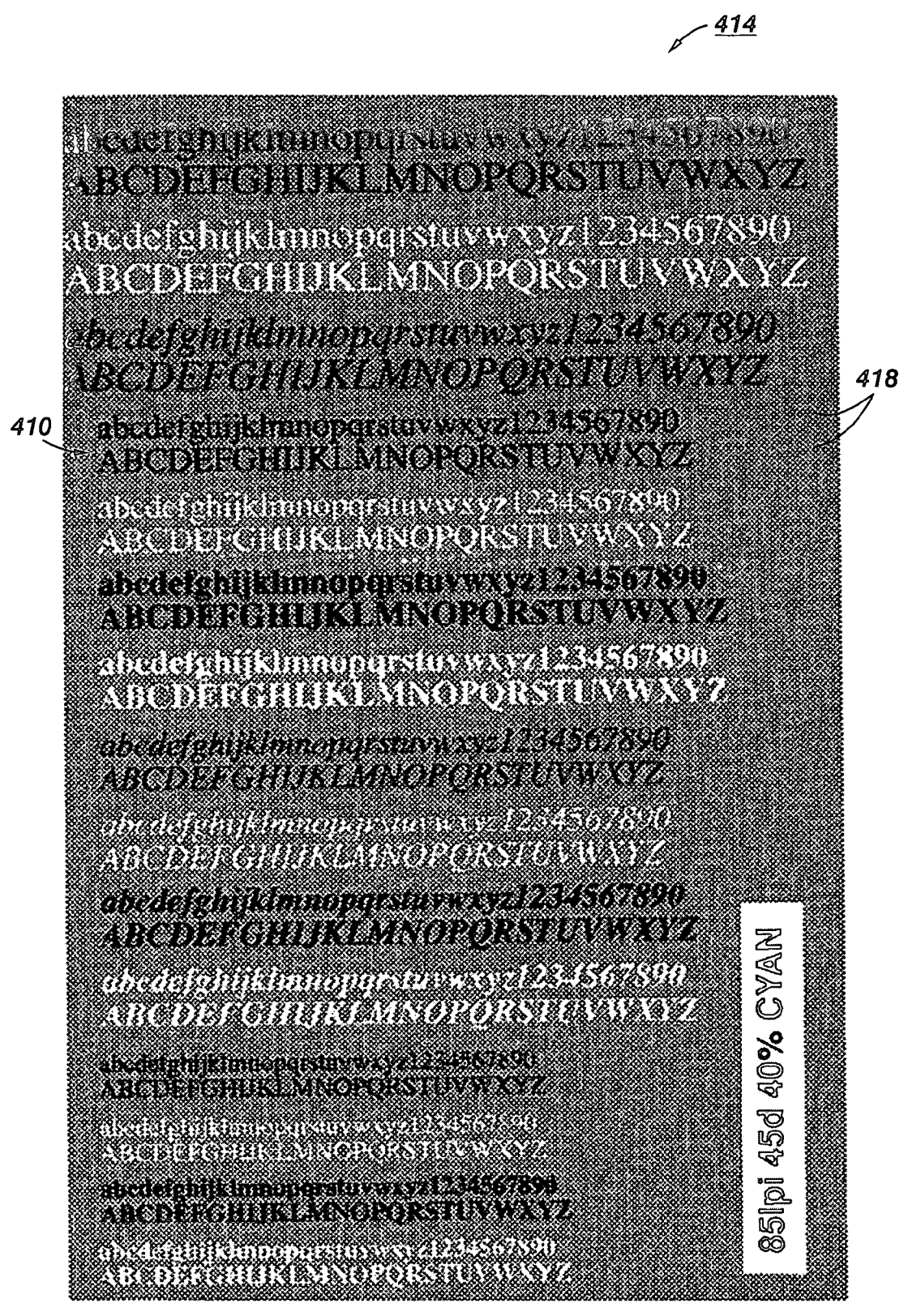

FIG. 3 is a renderable version of the scanned halftone image of FIG. 1, generated using a simple thresholding procedure;

Figure 5:
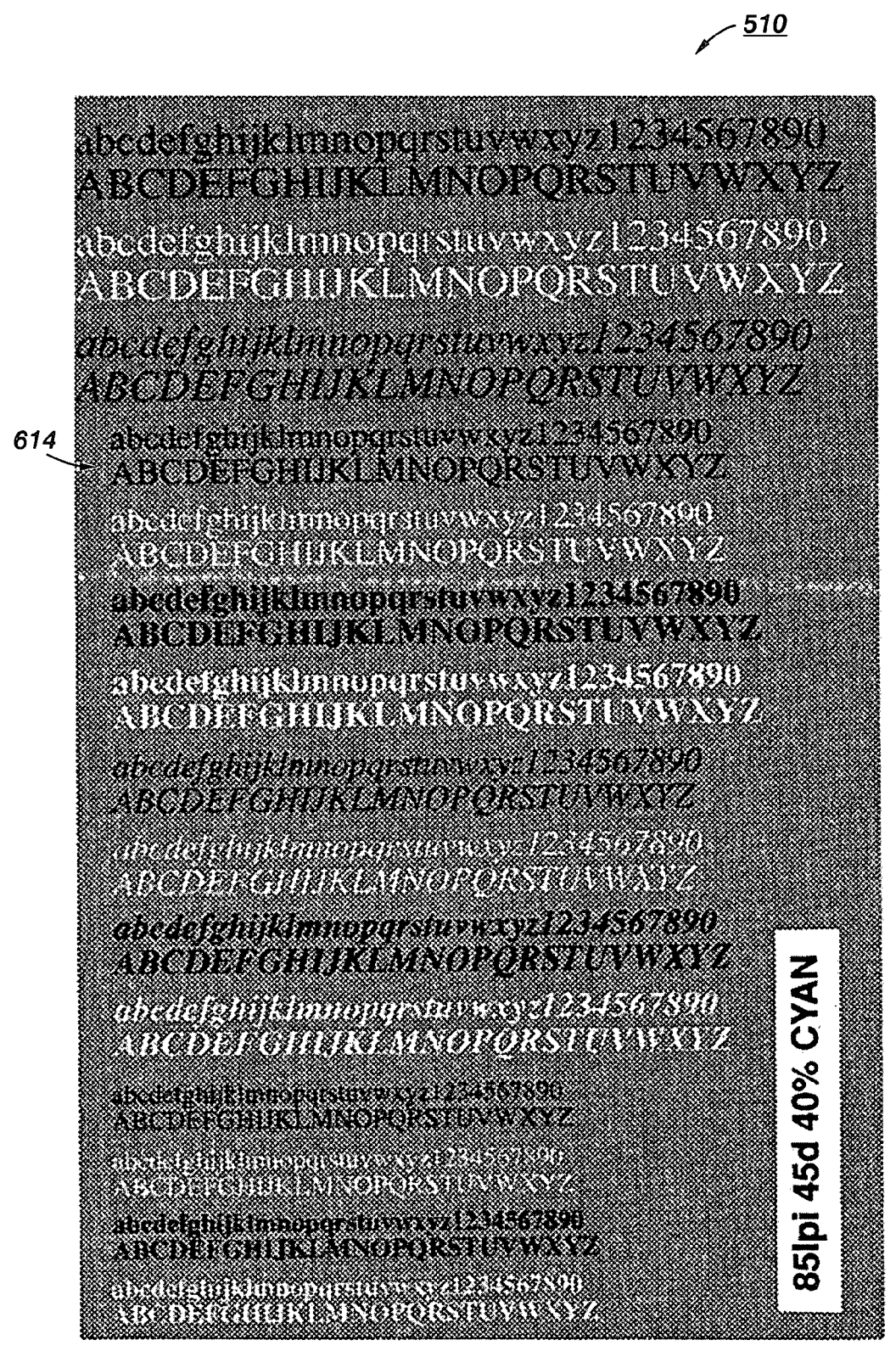

FIG. 5 is a renderable version of the scanned halftone image of FIG. 1, generated through standard Floyd-Steinberg error diffusion;

FIG. 7 is a renderable version of the scanned halftone image of FIG. 1, generated through a rank ordered error diffusion method;

FIG. 12 illustrates an exemplary diffusion mask employable for a full ROED algorithm for a target pixel;

FIG. 13 illustrates an exemplary diffusion mask employable for an ROED algorithm according to one or more of the features described herein;

FIG. 14 illustrates a flow chart of a 2 pair, 2 way rank ordering method; and

DETAILED DESCRIPTION OF EXEMPLARY EMBODIMENTS

Figure 2:
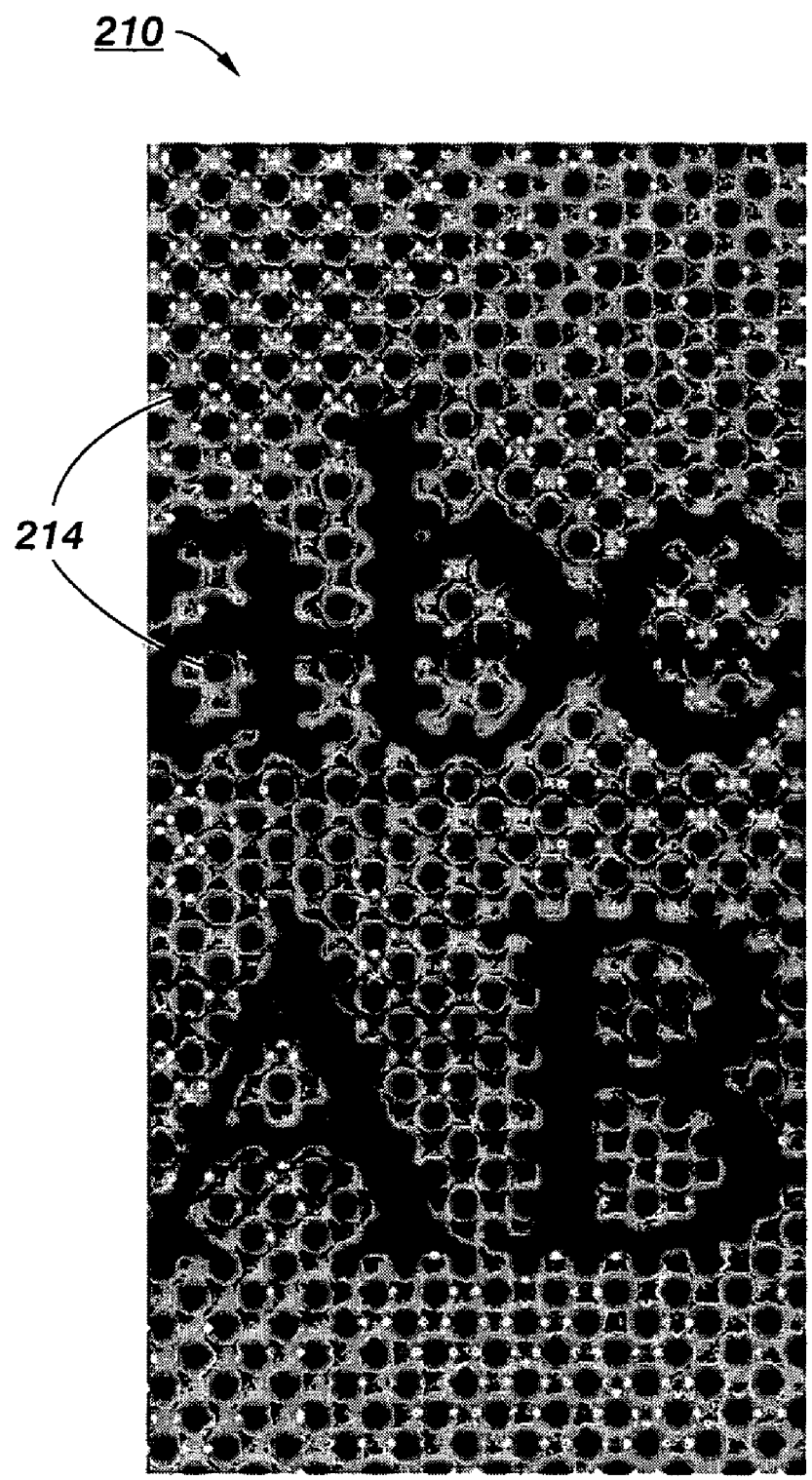
FIG. 2 illustrates a magnified view of a portion of the scanned halftone image illustrated in FIG. 1.
Figure 4:
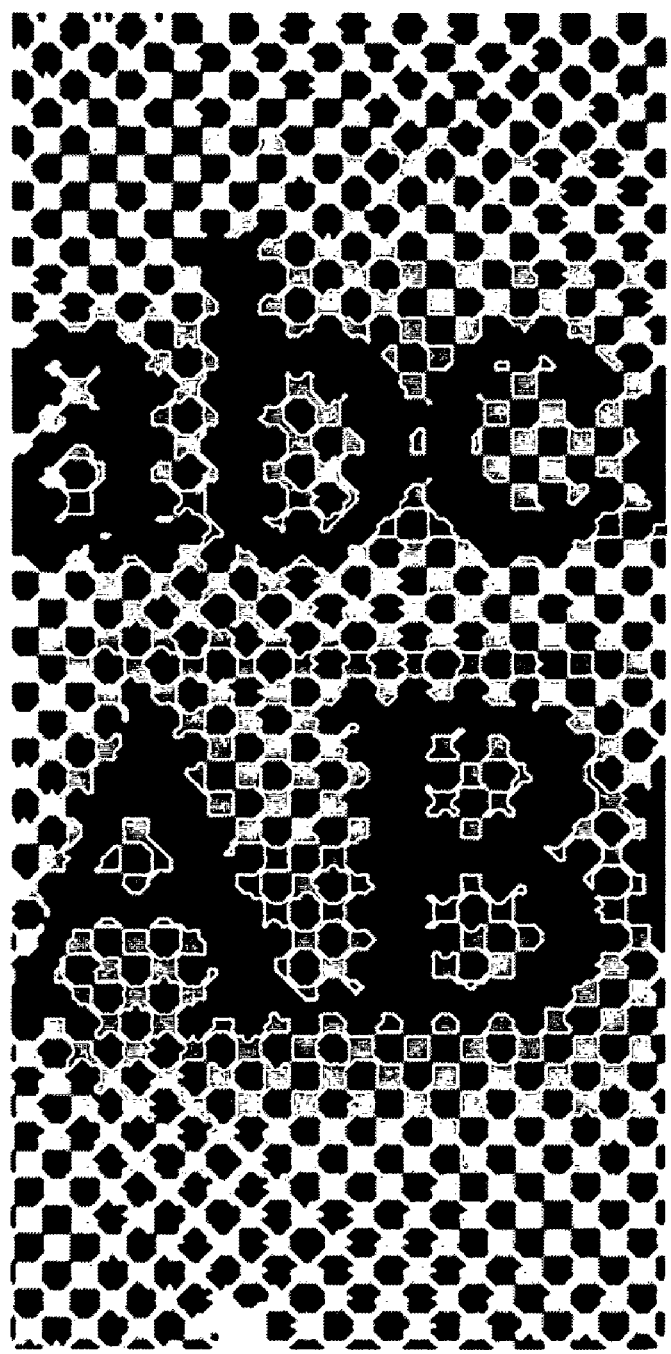
FIG. 4 is a magnified view of a portion of FIG. 3.
Figure 6:
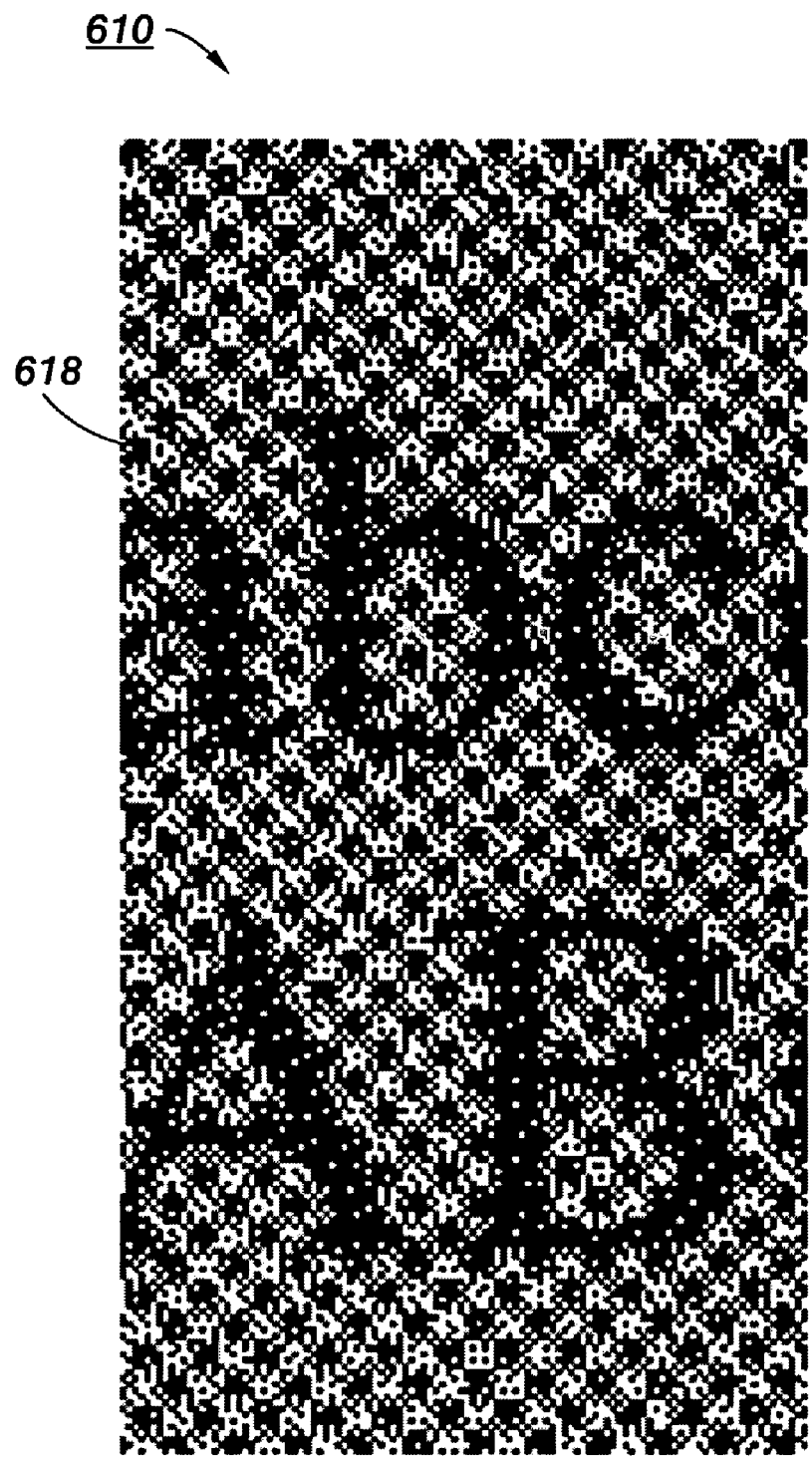
FIG. 6 is a magnified view of a portion of the standard Floyd-Steinberg error diffuision generated version illustrated in FIG. 5.

Throughout the following description, numerous specific structures/steps are set forth in order to provide a thorough understanding of the exemplary embodiments. Embodiments can be practiced without utilizing all of the specific structures/steps of the exemplary embodiments described below. In other instances, well known elements have not been shown or described in detail, so that emphasis can be focused on exemplary embodiments in which one or more aspects of the invention have been implemented.

It will become evident from the following discussion that the embodiments of the present application set forth herein, are suited for use in a wide variety of printing and copying systems, and are not necessarily limited in application to the particular systems illustrated. For example, to avoid overly complicating the following description of the exemplary embodiments of systems and methods that practice the invention, various exemplary embodiments of the invention will be described below in the context of processing monochromatic, e.g., black and white/gray-scale image data (single color separation). However, this invention can be applied to any digital image data, such as the processing of color images, wherein each color image separation is treated, effectively as a gray-scale image, or each dimension in a color space representation is treated as a gray-scale image. Accordingly, references herein to the processing of gray-scale images are intended to include the processing of color images and color image separations as well.

In describing the exemplary embodiments, the term "data" refers herein to physical signals that indicate or include information. An "image", as a pattern of physical light or a collection of data representing the physical light, may include characters, words, and text as well as other features such as graphics and pictorial content. A "digital image" is, by extension, an image represented by a collection of digital data. In a digital image composed of data representing physical light, each element of data may be called a "pixel" which is commonly used in the art and refers to a picture element. Each pixel has a location and a value. Each pixel value is a bit in a "binary form" of an image, a gray scale value in a "gray scale form" of an image, or a set of color space coordinates in a "color coordinate form" of the image. The binary form, gray scale form and color coordinate form each being a two-dimensional array defining an image. Although described herein as black and white continuous tone processing, the systems and methods described herein apply equally as well to the processing of color images, wherein each separation or color plane is treated, effectively, as a gray scale or a continuous tone image. Accordingly, references herein to the processing of continuous tone (contone) or gray scale images is intended to include the processing of color image separations as well. Further, an operation performs "image processing" when it operates on an item of data that relates to a part or all of an image.

An image may be a high addressability image if even only a single pixel of the image is formatted, sampled or produced in one of many known scenarios, all of which may apply to various implementations of the invention. A high addressability pixel can be a pixel comprising a plurality of high addressability pixel events, where, for example, each of the high addressability pixel events corresponds to a specific spatial placement of the writing spot with respect to the pixel and has a value that represents a property of the writing spot at that specific spatial placement. In binary high addressability pixels, for example, each high addressability pixel event is a single bit indicating whether the writing spot is "on" or "off" at the corresponding spatial placement. In general, high addressability, as used above, refers to a pixel grid where the spatial sampling of the grid is higher in one dimension than in the other dimension.

High addressability also commonly refers to an imaging method where the imaging device can position the writing spot with precision finer than the size of the writing spot. For instance, a typical spot per inch (spi) high addressability system may operate with a 40 micron writing spot, an addressability of 600/inch in the direction perpendicular to the raster lines, and an addressability of 4800/inch in the direction of the raster lines.

High addressability also refers to writing an image with a higher sampling resolution than is input to the writing system. Similarly, high addressability also refers to a pixel sampling resolution that is higher than the input resolution in at least one dimension. For example, an input resolution of 300 spi may be converted to 600 spi and that resolution conversion is referred to as high addressability.

Systems that write high addressability images typically regulate a laser or similar writing device using clock modulation, amplitude modulation, pulse width modulation, pulse width position modulation or equivalent procedures. Imaging devices other than laser scanners can also employ high addressability. For instance, ink jet devices can have drop ejection rates that yield drop placements at high addressability and LED image bars can clock the LED "on" events at rates that are high relative to the spot size and diode spacing.

One or more of the features of the exemplary embodiments described herein may be applied to any digital image, including, for example, a binary image, a continuous tone (contone) image, and a high addressability image.

Figure 7:
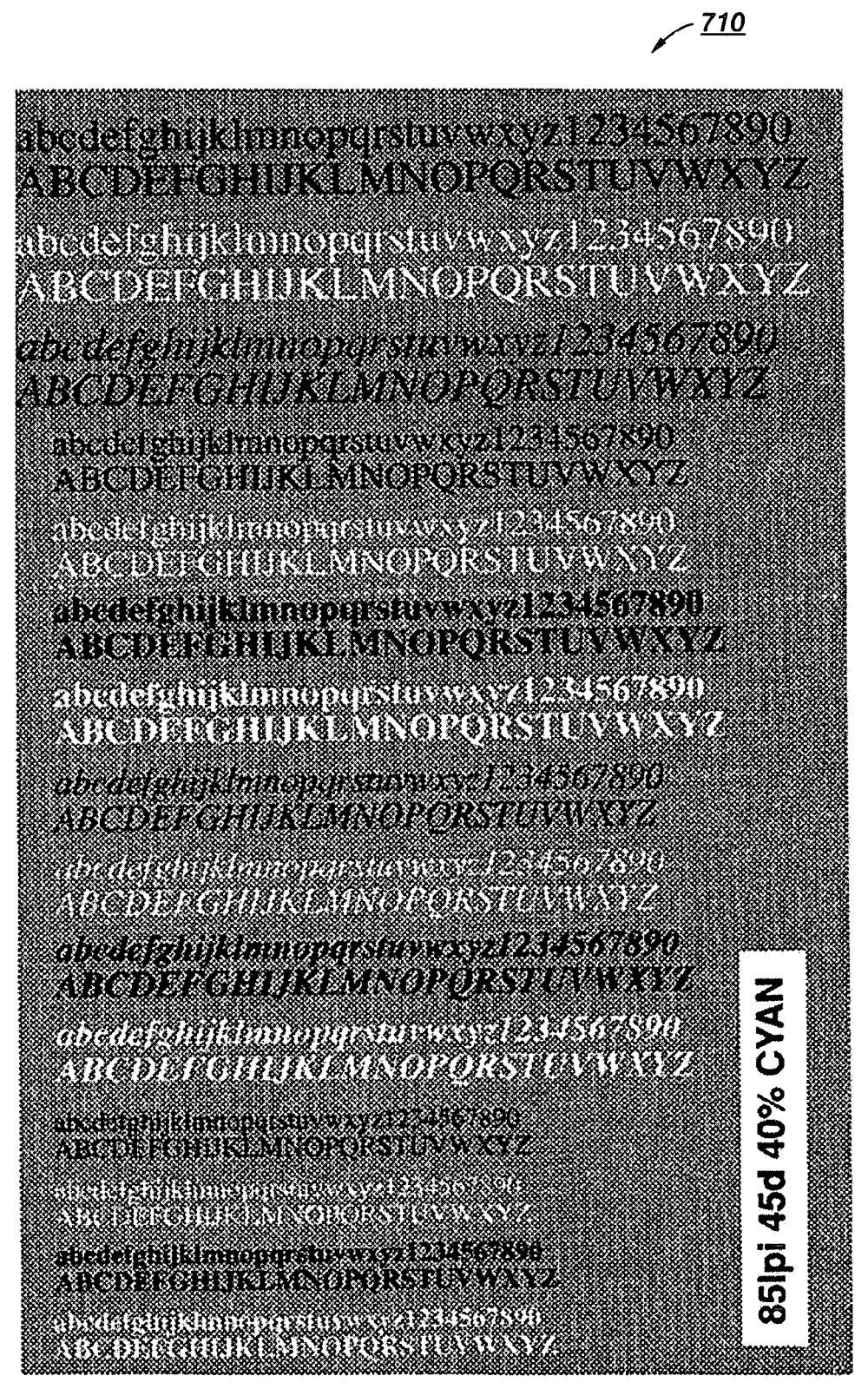
Figure 8:
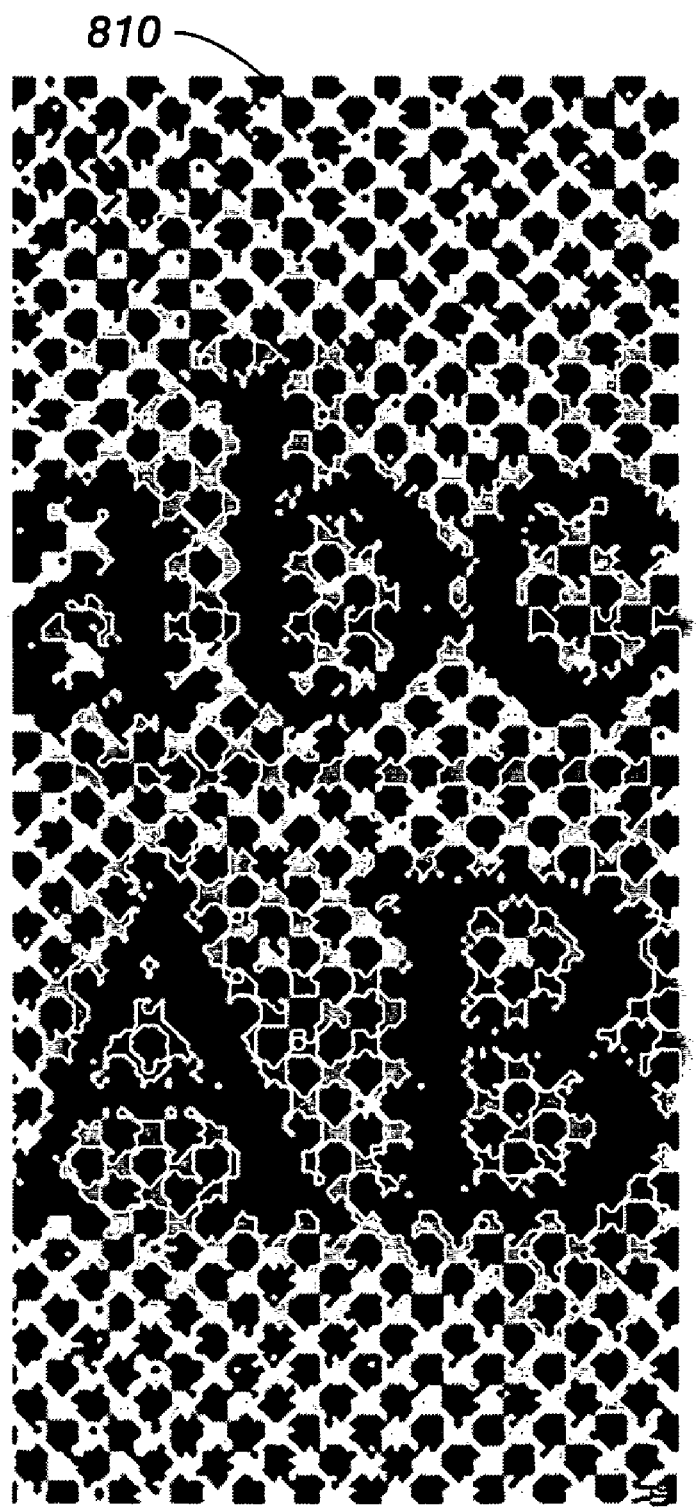
FIG. 8 is a magnified view of a portion of the rank ordered error diffusion generated version illustrated in FIG. 7.

Referring to FIG. 7, in contrast to the prior art methods described above, rank-order error diffusion yields a rank-order error-diffusion (ROED) version 710 of the scanned halftoned image 110 that is relatively free of pattern artifacts and, at the same time, as can be observed in FIG. 8, is comprised of relatively compact dots 810. As a result, when rendered, the rank-order error-diffusion version 710 does not appear noisy and is not subject to the temporal stability, spatial non-uniformity and dot gain errors that are apparent in images prepared by prior art error diffusion methods.

U.S. Patent Publication No. US 2003/0090729, which is hereby incorporated by reference in its entirety, describes a method for performing ROED. Rank-ordered error diffusion (ROED) substantially maintains the original clustering of the halftone dots while introducing a small amount of, and preferably no, undesirable textures. Maintaining clustering aids in achieving stability, uniformity, low graininess and linearity. A key application of the improved ROED processing described herein is the rendering of "grayed halftones." As discussed above, there are many sources of grayed halftones that can be beneficially treated with improved ROED.

Figure 9:
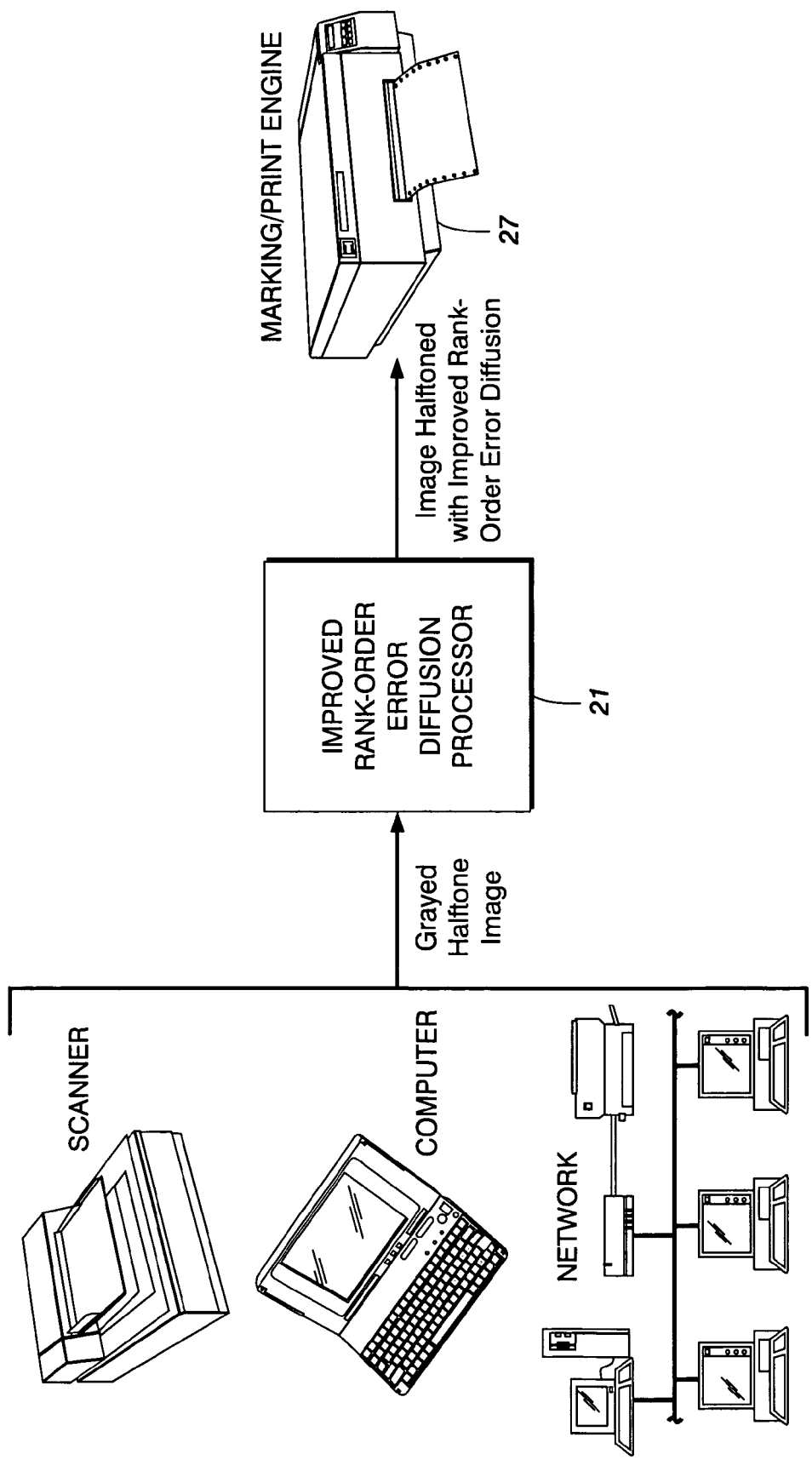
FIG. 9 illustrates a general system level embodiment employing one or more of the features described herein.

FIG. 9 illustrates a general system level embodiment for a system for performing optimized ROED. For example, FIG. 9 illustrates that the grayed halftone image data is received by an optimized ROED processor 21, from a scanner, a computer or a network. The optimized ROED processor 21 is capable of any known image processing methods including, for example, controllable TRC adjustment as disclosed in U.S. patent application Ser. No. 11/034,057 to Loce et al., filed Jan. 13, 2005, which is incorporated herein by reference in its entirety. The image halftoned with improved/optimized ROED is output by a system in which one or more aspects of the invention is/are implemented is then rendered, for example, by a marking/print engine 27.

Figure 10:
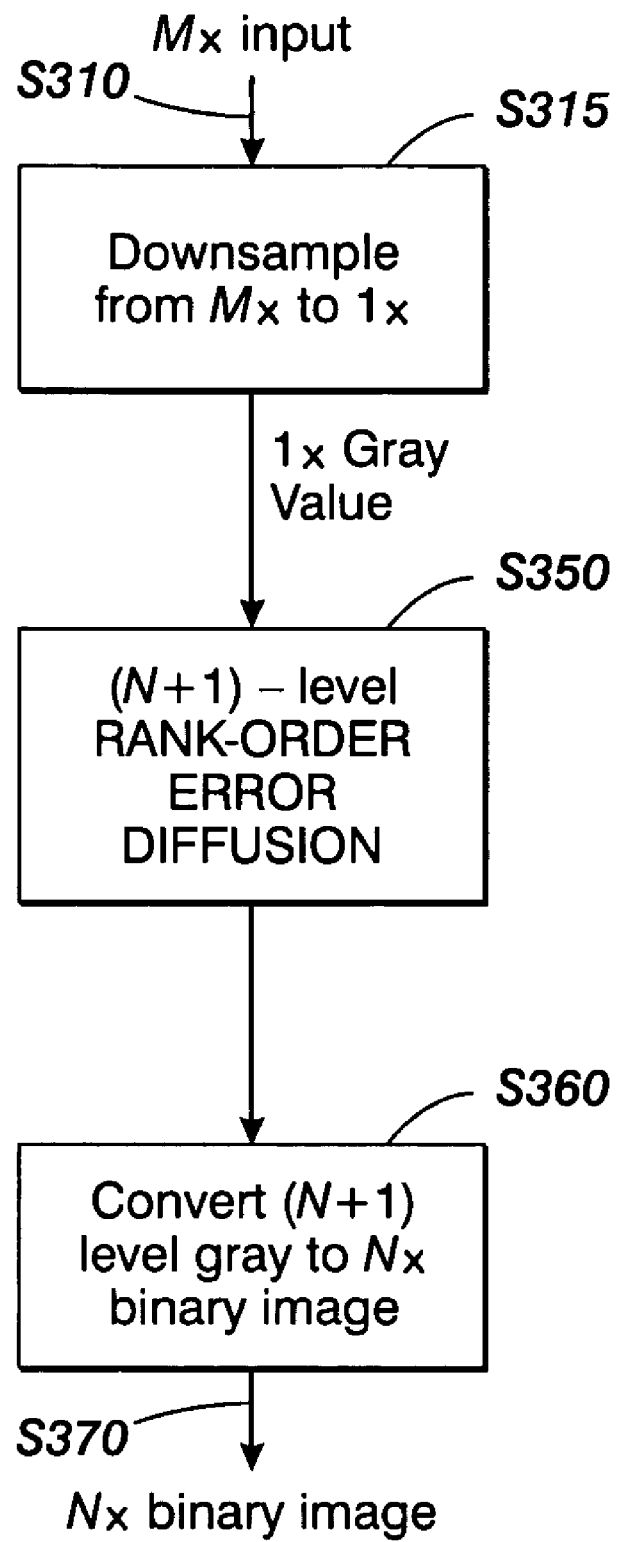
FIG. 10 is a flow chart outlining an exemplary embodiment of a system for performing improved ROED.

FIG. 10 is a flow chart outlining an exemplary embodiment of a method for ROED halftoning that employs one or more of the features described herein. It is desired to provide a method for ROED halftoning an image, which is input or received at an input resolution M×, processed at a processing resolution 1×, for example, and output at an output resolution N×. The processing resolution may be any integer or non-integer multiple of a base or reference resolution and the input resolution and the output resolution may be any integer or non-integer multiple thereof (including 1 such that they would be the same). For example, the processing resolution may be 1.5×, 2×, 3×, etc. In the following description of exemplary embodiments, to simplify the discussion, a processing resolution of 1×, for example, will be used and integer multiples thereof will be used for the input resolution and the output resolution.

Further, in some situations the input resolution, the processing resolution and the output resolution may be the same. In other situations it may be necessary and/or desirable for one or all of the resolutions to be different. Thus, some embodiments may have the same input, processing and output resolutions, some embodiments may have different input, processing and output resolutions, some embodiments may have same input and processing resolutions but a different output resolution, and some embodiments may have same processing and output resolutions, but a different input resolution, etc.

According to the exemplary embodiment shown in FIG. 10, step S310 provides an input image at M× addressability, step S315 performs down-sampling of the input image to a processing resolution (e.g.,1×). Step S350 is the ROED step during which the downsampled image is subjected to ROED, and step S360 is a function for converting the N+1 level gray image to an image with high addressability such as, for example, an N× addressability binary image. For example, in step S370, an 8× image may be outputted.

More particularly, the process begins by providing an input image at an input resolution M×. In the exemplary embodiment, if the target pixel is not at the processing resolution 1×, for example, the target pixel will be down-sampled to the processing resolution using an averaging process to obtain an average value of the target pixel during step S315.

Next, the process proceeds to step S350 where ROED is performed to render the image to an N+1 level gray image. For example, for an 8× high addressability input, the image may be rendered as a 9-level gray image. Error calculation and diffusion by ranking are two important aspects of ROED. A flow chart of an exemplary ROED process is illustrated in FIG. 11.

Figure 11:
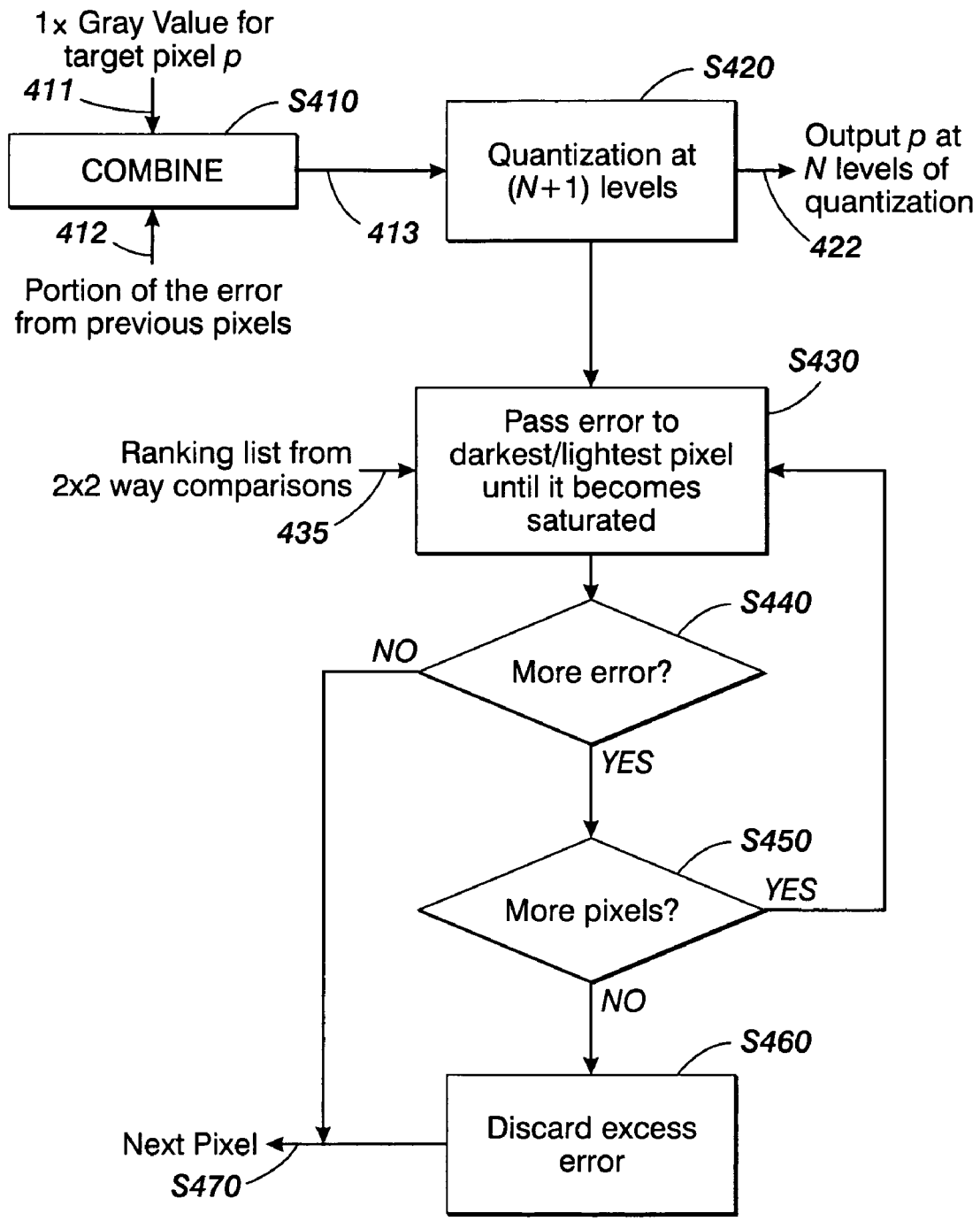
FIG. 11 is a flow chart outlining a method for performing ROED employing one or more of the features described herein.

FIG. 11 is a flow chart outlining an exemplary method for performing ROED. As shown in FIG. 11, in step S410, quantization error 412 from diffusion of previously processed pixel neighbors is added to the target pixel value 411 to update the value of the target pixel p.

In the exemplary embodiment illustrated in FIG. 11, in step S420, the output pixel value and error value are computed with N+1 quantization levels based on N addressability. For example, in one exemplary embodiment, the output pixel value and the error value are computed based on 9 quantization levels (e.g., 0, 32, 64, 96, 128, 160, 192, 224, and 256) which are stored as a LUT. At step S420, the difference between the updated value of target pixel 413 and the corresponding LUT value determines the error from pixel p due to the 9-level quantization.

Next, in step S430, the error is passed out to error memory buffers for the pixels within the mask according to the ranked list 435 of the pixels and the sign of the error. The amount of error a neighboring pixel can receive, depends on the pixel's value relative to a predefined saturation limit. The saturation limit is often defined as 0 and 255 for 8 bit memory buffers. However, a negative number or a number above 255 can be allowed and generally does not affect the flow of the process. For example, in some embodiments, higher quantization and parameterized clipping limits may be used. In some embodiments, for example, saturation limits of −255 and 511 for a 10 bit signed memory buffer are employed. If the next darkest/lightest pixel is saturated, in step S440 it it determined whether there is more error. If there is no more error to be passed, the process proceeds to step S470, where the process repeats for the next pixel. If, however, there is still error remaining to be passed (S440:Yes), then the process proceeds to step S450 where it is determined if there are more pixels. If it is determined that there are more pixels, the process returns to step S430 where all or some of the remaining error is distributed to the next darkest/lightest pixel until that pixel becomes saturated or there is no more error to be passed. Steps S430 and S440 are repeated until either there are no more pixels to pass error onto (S450:No) or there is no more error to pass (S440:No). If, however, at step S450 it is determined that there are no more pixels (S450:No), then the excess remaining error is discarded in step S460. The process then repeats for the next pixel at S470 until all pixels are processed.

FIG. 12 illustrates a predefined diffusion mask 500 which may be employed for a full ROED algorithm for a target pixel. To determine the error distribution within the mask, full ROED requires a darkness/lightness ranking of all pixels within a predefined mask (e.g., pixels a-j of the diffusion mask 500 shown in FIG. 12). For example, when the error from pixel p is positive, all or part of the error is first added to the darkest pixel on the ranked list. The amount of the error (i.e., all or part) which is added depends on the difference between the pixel's value and the predefined threshold of the pixel. Thus, an amount of the error which would result in the value of the pixel being equal to or less than a predefined threshold (saturation, i.e., 0 or 255) may be added. All or part of the remaining error, if any, is then added to the next darkest pixel on the list, again so long as the resulting pixel value is equal to or less than the predefined threshold. The process continues until it is determined that no error or pixels remain in the mask. On the other hand, for example, when the error from pixel p is negative, all or part of the error is first added to the lightest pixel on the ranked list. The amount of the error (i.e., all or part) which is added depends on the difference between the pixel's value and the predefined threshold (saturation, i.e., 0). Thus, an amount of error which would result in the value of the pixel being equal to or greater than the saturation may be added. All or part of any remaining error is then added to the next lightest pixel on the list, again so long as the resulting pixel value is equal to or greater than the predefined threshold. The process continues until it is determined that no error or pixels remain in the mask.

The full ROED method described above preserves the compactness of clustered dot halftones without introducing undesirable texture artifacts. However, a full ranking of 10 or more pixels is generally not practical for hardware implementation.

A reduced or improved ROED process uses pairs of 2-way comparisons. A smaller mask, as shown in FIG. 13, for example, may also be used. In an embodiment where a smaller diffusion mask, such as the exemplary mask illustrated in FIG. 13, is used and a paired comparison is performed, 2 pairs of 2-way comparisons among 4 pixels (i.e., a, b, c and d) may be performed. The exemplary mask shown in FIG. 13 utilizes 4 pixels compared to the 10 pixels utilized by the mask shown in FIG. 12. The mask shown in FIG. 13 shortens the distance of error propagation in the fast-scan direction, which in turn results in a distance symmetry in the fast-scan direction and the slow-scan direction (e.g., direction substantially perpendicular to the fast-scan direction). This symmetry improves the uniformity treatment of line art. That is, the effect on line width is roughly isotropic (the effect on width is the same in all directions). The longer mask 500, shown in FIG. 12, may result in an observable uneven treatment of vertical and horizontal lines when applied at a 1× and 2-quantization level process.

Another feature is the use of position dependent rankings. For example, pixels of the diffusion mask that have a shorter distance to the target pixel are ranked higher than pixels that are more distant. In some embodiments, 2 pairs of 2 way comparisons are performed between pixels a and c, and between pixels b and d, as illustrated in FIG. 13. As discussed above, such a ranking method can be performed instead of the full ranking of 10 pixels to determine the error distribution among the pixels within the mask. In the exemplary embodiment, pixels a and c are assigned a higher ranking than pixels b and d because pixels a and c are closer (e.g., have a common side instead of only a common corner) to the target pixel p. Although in this exemplary embodiment, the diffusion mask involves pixels which are immediately adjacent (i.e., share a common side or corner) to the target pixel, in some embodiments one or all the "neighboring" pixels may not be immediately adjacent to the target pixel. Further, while the mask is illustrated as a combination of boxes, each corresponding to a pixel, for example, pixels are not necessarily in the shape of a box (i.e., square) and can have any general shape (e.g., circle, ellipse, irregular blob, random, etc.). Further, the pixels may be ranked, for example, from darkest to lightest or lightest to darkest based on the error to be diffused. That is, the type of ranking (e.g., lightest to darkest) may be determined based on the error that is to be diffused and/or other features of the pixel or image. In an embodiment employing the exemplary mask illustrated in FIG. 13, for example, in a rank list ranging from the darkest to the lightest pixels, the darker pixel between pixels a and c is ranked first and the lighter pixel between pixels a and c is ranked second, the darker pixel between pixels b and d is ranked third and the lighter pixel between pixels b and d is ranked fourth. This ranking can be stated mathematically as MAX[a, c], MIN[a, c], MAX[b, d], MIN[b, d]. This simplified ranking can efficiently be implemented in real-time hardware, whereas the full ROED method, which requires more comparisons is considerably less efficient when implemented in real-time hardware.

FIG. 14 illustrates a flow chart of an exemplary embodiment involving 2 pairs of 2-way comparisons between pixels a and c, and between pixels b and d for ranking the pixels from the darkest to the lightest using the exemplary diffusion mask illustrated in FIG. 13. In the exemplary embodiment, pixels a and c take precedent over pixels b and d on the ranking list because pixels a and c are the closest neighbors of the target pixel p. In step S1510 two (2) pairs of pixels are input. Pixels a, b correspond to the first pair and pixels c, d correspond to the second pair. Next, in step 1520 inputted pixels a and c are compared. In this exemplary embodiment, if pixel a is darker than (>) pixel c, then pixel a is ranked first and pixel c is ranked second. If on the other hand, pixel c is darker than (>) pixel a then pixel c is ranked first and pixel a is ranked second.

If the pixels are, for example, to be ranked from the lightest pixel to the darkest pixel, if pixel a is lighter than (<) pixel c, then pixel a is ranked first and pixel c is ranked second. If, on the other hand, pixel c is lighter than (<) pixel a, then pixel c is ranked first and pixel a is ranked second.

After ranking pixels a and c, in step S1530 pixels b and d are similarly compared. If pixel b is darker than pixel d then pixel b is ranked third and pixel d is ranked fourth. If on the other hand, pixel d is darker than pixel b then pixel d is ranked third and pixel b is ranked fourth.

If the pixels are, for example, to be ranked from the lightest pixel to the darkest pixel, if pixel b is lighter than (<) pixel d, then pixel b is ranked third and pixel d is ranked fourth. If, on the other hand, pixel d is lighter than (<) pixel b, then pixel d is ranked third and pixel b is ranked fourth.

In the exemplary embodiment, if, the diffused error is positive, ranking the pixels from darkest to lightest is employed. However, in the exemplary embodiment, if the diffused error is negative, ranking of the pixels from lightest to darkest is employed. Diffusing the error in the order of the ranking contributes to achieving the desired compact dot growth objective.

Next, in step S1540 the pixels are ranked from the first to the fourth. A LUT can be used in this comparison process to reduce computation and build in flexibility for future image quality tuning. Thus, this simplified ranking can be practically and efficiently implemented in real-time hardware.

In another exemplary embodiment involving multiple pairs of 2-way comparison, a different, and possibly larger, mask may be employed. For example, in an embodiment using the mask of FIG. 12, an example of paired comparison hierarchy may involve comparing pixels a, g to obtain a first result, comparing pixels f, h to obtain a second result, comparing pixels b, i to obtain a third result, and comparing pixels c, j to obtain a fourth result. These results obtain from these comparisons can be used to rank-order the pixels based, for example, on the distances between the pixels being compared and the target pixel. For instance, the ranking for this example could be ordered as MAX[a, g], MIN[a, g], MAX[f, h], MIN [f, h], MAX[b, i], MIN[b, i], MAX[c, j], MIN[c, j]. Other masks and other pairing schemes may be used.

Figure 15:
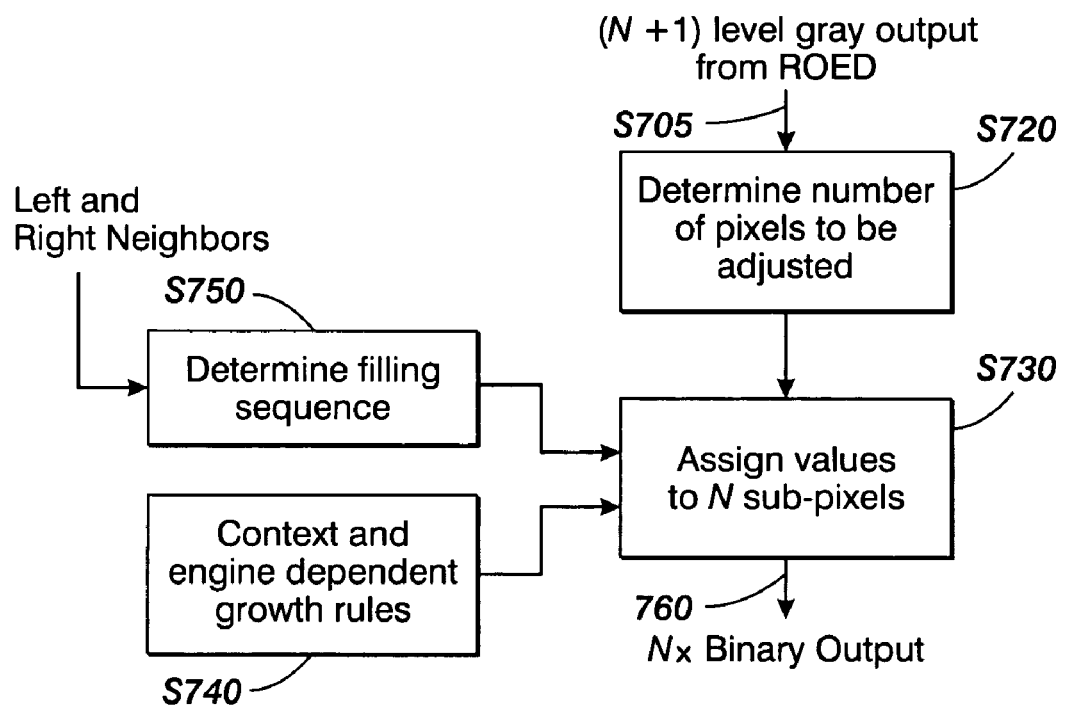
FIG. 15 is a flow chart outlining a method for converting a 9 level gray image to an 8× binary output.

Referring back to FIG. 10, the method proceeds to step S360 to convert the N+1 level gray image to a high addressable binary output N× before outputting the N× in step S370. FIG. 15 illustrates an exemplary process for step S360 in more detail. Generally, the N+1 level gray output is converted to an N× binary output 760 based on the knowledge of the original pixel ranking and its left and right neighboring pixels.

As shown in FIG. 15, in step S705 the N+1 level gray (e.g., 9 level gray) output from ROED processing is input. In step S720, the number of pixels to be adjusted is determined. For example, the number of on and off output high addressable pixels are determined. The value D (not shown) obtained from step S705 corresponding to the gray level output from ROED processing is used to determine the number of sub-pixels for that pixel in the subsequently created intermediate image. The number of high addressable sub-pixels to be set to black is computed as T=INT(D/L), where L=Q/N, INT( ) means round to the closest non-negative integer, and Q is the quantization level. For example, for 8× addressability and 256 level quantization, the number to toggle T is T=INT(D/32). The formula is easily modified for different levels of addressability or quantization. This quantization stage can also accept context and/or engine dependent growth rules to increase repeatability.

Quantizing the target pixel is generally dependent on the target pixel context. For a given level of gray, the left/right/center/split positional justification depends on the context. In addition, a number of high addressable pixels may be rounded up or down in order to achieve an engine dependent minimum size constraint. This can be achieved, for example, using context and/or engine dependent growth rules in step S740. These growth rules may require, for example, left-sided justification to be chosen based on one context, and centered justification with a minimum size constraint be imposed based on another context. After the modified target pixel value is quantized, for example, by the above ROED process in step S360, the process proceeds to step S370, where a print-ready image data is output to the print/marking engine 27, for example.

In step S730, values are assigned to the high-addressable sub-pixels based on (a) a comparison made between the down-sampled Left (L) and Right (R) neighbors during step S750, and (b) the target pixel scaled up to a high addressability or a higher high addressability, such as, for example, a 4× binary input scaled up to an 8× binary image. In an exemplary embodiment, the following rules are used to assign values to the sub-pixels:

(1) The distribution of the filling sequence of the 8-subpixels of the N× binary input in step S750 takes higher priority than the target pixel scaled to high addressability in step S740.

(2) The filling sequence is determined in step S750 by the following rules:

(a) If operating by setting sub-pixels to black: i) If L>R, from left to right, set sub-pixels to black until the number of sub-pixels need to be set is reached; ii) If the R>L, from right to left, set sub-pixels to black until the number of sub-pixels need to be set is reached; and iii) If L=R, from center to two sides, set sub-pixels to black symmetrically until the number of sub-pixels need to be set is reached.

(b) If operating by setting sub-pixels to white: i) If L>R, from right to left, set sub-pixels to white until the number of sub-pixels need to be set is reached; ii) If R>L, from left to right, set sub-pixels to white until the number of sub-pixels need to be set is reached; and iii) If L=R, from center to two sides, set sub-pixels to white symmetrically until the number of sub-pixels need to set is reached.

In embodiments employing context and/or engine-dependent growth rules, context and/or engine dependent growth rules addresses the problem that an isolated sub-pixel region cannot generally be reproduced in a consistent manner by many marking processes. It is desirable to avoid stressful imaging events (i.e., isolated small dark spots that are difficult to develop or small gaps surrounded by exposed areas that get plugged due to dot growth) in order to improve repeatability. In some embodiments, a growth facilitator provides context and/or engine dependent growth rules in step S740. The growth facilitator determines quantization rules in addition to the aforementioned quantization table. The growth facilitator will not permit an isolated sub-pixel to be used if diffusing the error is a viable alternative. For example, if quantizing the modified target pixel value suggests generating an isolated ⅛ pixel output, the growth facilitator will demand that the isolated ⅛ pixel is removed, and the resulting positive error is diffused to one of the available neighboring gray pixels. However, if a neighboring gray pixel is not available, the growth facilitator will, for example, implement a growth rule resulting in a more easily reproduced ⅜ pixel spot to be output, and the resulting negative error be diffused. It is generally desirable to avoid fragile features such as small spots and gaps because these unreliable features are detriments to the quality and reproducibility.

The assignment rule may be adapted to different engine responses. For example, when a marking/print engine cannot reliably reproduce a single sub-pixel or some small number of sub-pixels, its surrounding context should be considered so that this small group of sub-pixel-sized events are eliminated or minimized, as discussed above with regard to step S740. Further, the context and/or engine dependent growth rules may have different definitions for the size of a small sensitive sub-pixel group for a white group or a black group.

As discussed above, the process then returns to step S310 where a next target pixel is selected. Steps S315-S370 are repeated until all of the pixels corresponding to a portion or the entire received image are modified according to steps S350-S370. The process ends after all the pixels of the desired portion or the entire image, for example, are adjusted.

While the above description of various exemplary embodiments refer to high addressability, the methods implementing one or more of the features discussed above can also be used with pulse-width-pulse-modulated (pwpm) or LED bar marking processes.

It should be appreciated that the systems and methods described herein can be implemented on a general purpose computer. However, it should also be appreciated that the various embodiments of the features described herein can also each be implemented on a special purpose computer, a programmed microprocessor or micro-controller and peripheral integrated circuit elements, an application specific integrated circuit (ASIC) or other integrated circuit. In general, any device capable of implementing the flowcharts shown in FIGS. 10, 11, 14 and 15 can be used to implement any of the methods for performing improved ROED.

While the exemplary embodiments have been outlined above, many alternatives, modifications and variations will be apparent to those skilled in the art. Accordingly, the exemplary embodiments, as set forth above, are intended to be illustrative and not limiting. Modifications and alterations will occur to others upon reading and understanding this specification. While the exemplary systems and methods have, for the most part, been described in terms of preparing an image for rendering on a binary device, preparing an image for rending on a device with an increased number of quantization levels is contemplated. Those skilled in the art will understand how to modify exemplary embodiments for a number of quantization levels above two.

While the exemplary systems and methods have, for the most part, been described in terms of applying error to pixel values, it is to be understood that error can equivalently be applied to threshold values. It is intended that all such modifications and alterations are included insofar as they come within the scope of the appended claims or equivalents thereof.

What is claimed is:

1. A method of halftoning an image, the method comprising:
    quantizing a selected target pixel of a received image;
    determining a quantization error for the selected target pixel;
    selecting a diffusion mask encompassing pixels that have not yet been processed, the mask relating to the target pixel and pixels neighboring thereto;
    receiving a first pair of neighboring pixel values for a first pixel pair including a first neighboring pixel and a second neighboring pixel;
    receiving a second pair of neighboring pixel values for a second pixel pair including a third neighboring pixel and a fourth neighboring pixel;
    determining a ranking order of the first, second, third and fourth neighboring pixels by comparing the first neighboring pixel value with the second neighboring pixel value and comparing the third neighboring pixel and the fourth neighboring pixel, where the first neighboring pixel and the second neighboring pixel are closer to the target pixel than the third neighboring pixel and the fourth neighboring pixel; and
    diffusing error to at least one of the first, second, third and fourth neighboring pixels based on the determined ranking order of the first, second, third and fourth neighboring pixels.

2. The method of claim 1, wherein the quantized target pixel is output to an intermediate image.

3. The method of claim 2, further comprising at least one of:
    resampling the received image to a processing resolution if an input resolution of the received image and a processing resolution are not the same, the processing resolution being the resolution at which the image is subjected at least to the determining and diffusing steps, and
    resampling the intermediate image to a desired output resolution for the image if the processing resolution and the output resolution are not the same.

4. The method of claim 3, wherein the output resolution is a high addressable resolution.

5. The method of claim 4, wherein the step of resampling the intermediate image includes using context and/or engine dependent growth rules.

6. The method of claim 5, wherein the context and/or engine dependent growth rules are used to assign values to high-addressable sub-pixels based on a comparison made between Left and Right neighboring sub-pixels.

7. The method of claim 4, wherein the context and engine dependent growth rules are adapted to a given engine response by eliminating or minimizing an isolated "on" sub-pixel or a small group of "on" sub-pixels.

8. The method of claim 4, wherein the context and engine dependent growth rules are adapted to a given engine response by eliminating or minimizing an isolated "off" sub-pixel or a small group of "off" sub-pixels.

9. The method of claim 3, further comprising selecting a processing path across the image, wherein the processing path is a left to right scanning path, and the first, second, third and fourth neighboring pixels encompassed by the selected diffusion mask are located to a right of and below the selected target pixel.

10. The method of claim 1, wherein:
    the error to be diffused is positive and the comparison of the first neighboring pixel value and the second neighboring pixel value determines which is darker and whichever of the first neighboring pixel and the second neighboring pixel is darker is ranked first and whichever of the first neighboring pixel and the second neighboring pixel is lighter is ranked second, and
    the comparison of the third neighboring pixel value and the fourth neighboring pixel value determines which is darker and whichever of the third neighboring pixel and the fourth neighboring pixel is darker is ranked third and whichever of the third neighboring pixel and the fourth neighboring pixel is lighter is ranked fourth.

11. The method of claim 1, wherein:
    the error to be diffused is negative and the comparison of the first neighboring pixel value and the second neighboring pixel value determines which is lighter and whichever of the first neighboring pixel and the second neighboring pixel is lighter is ranked first and whichever of the first neighboring pixel and the second neighboring pixel is darker is ranked second, and
    the comparison of the third neighboring pixel value and the fourth neighboring pixel value determines which is lighter and whichever of the third neighboring pixel and the fourth neighboring pixel is lighter is ranked third and whichever of the third neighboring pixel and the fourth neighboring pixel is darker is ranked fourth.

12. The method of claim 1, wherein determining comprises comparing the first, second, third and fourth neighboring pixels using a look-up table.

13. A method of halftoning an image, the method comprising:
   receiving the image, the received image being at an input resolution;
   resampling the image to a processing resolution if the input resolution and the processing resolution are not the same;
   processing the image using rank-ordered error diffusion; and
   resampling the processed image to an output resolution for the image if the processing resolution and the output resolution are not the same,
   wherein the rank-ordered error diffusion includes
      selecting a diffusion mask encompassing pixels that have not yet been processed, the mask relating to a target pixel and pixels neighboring thereto;
      receiving a first pair of neighboring pixel values for a first pixel pair including a first neighboring pixel and a second neighboring pixel;
      receiving a second pair of neighboring pixel values for a second pixel pair including a third neighboring pixel and a fourth neighboring pixel;
      determining a ranking order of the first, second, third and fourth neighboring pixels by comparing the first neighboring pixel value with the second neighboring pixel value and comparing the third neighboring pixel and the fourth neighboring pixel, where the first neighboring pixel and the second neighboring pixel are closer to the target pixel than the third neighboring pixel and the fourth neighboring pixel; and
      diffusing error to at least one of the first, second, third and fourth neighboring pixels based on the determined ranking order of the first, second, third and fourth neighboring pixels.

14. The method of claim 13, wherein the resampling the processed image to the output resolution comprises resampling the processed image to generate a high addressable image.

15. The method of claim 13, wherein the resampling the image to a processing resolution comprises averaging a plurality of high addressable sub-pixels of the received image.

16. The method of claim 13, wherein the step of resampling the processed image to the desired output resolution comprises:
   obtaining an output value of the intermediate image D for the target pixel; and
   determining a number of high addressable sub-pixels to set to black computed as T=INT(D/L), where L =Q/N, INT( ) means round to the closest non-negative integer, and Q is the quantization level.

17. The method of claim 16, further comprising:
   determining a filling sequence for assigning values to the neighbor pixels;
   setting the sub-pixel values to black until T is reached; and
   outputting the processed image at the desired output resolution.

18. The method of claim 17, wherein determining a filling sequence further comprises utilizing a context and engine-dependent growth rule.

19. The method of claim 16, wherein the step of determining a filling sequence comprises comparing a resampled left neighbor and a resampled right neighbor of the selected target pixel.

20. A halftoning apparatus, comprising:
   an image receiving unit; and
   a rank-order error diffusion processing unit that receives a grayed halftone image from the image receiving unit and processes the receiving grayed halftone image to output a renderable version of the received grayed halftone image which has been subjected to rank-order error diffusion,
   wherein the rank-order error diffusion unit resamples the received grayed image to a processing resolution if an input resolution of the received grayed image and the processing resolution are not the same, the processing resolution being a resolution at which the received grayed image is subjected to processing by the rank-order error diffusion processing unit,
   wherein the rank-order error diffusion processing unit
      selects a diffusion mask encompassing pixels that have not yet been processed, the mask relating to a target pixel and pixels neighboring thereto;
      receives a first pair of neighboring pixel values for a first pixel pair including a first neighboring pixel and a second neighboring pixel;
      receives a second pair of neighboring pixel values for a second pixel pair including a third neighboring pixel and a fourth neighboring pixel;
      determines a ranking order of the first, second, third and fourth neighboring pixels by comparing the first neighboring pixel value with the second neighboring pixel value and comparing the third neighboring pixel and the fourth neighboring pixel, where the first neighboring pixel and the second neighboring pixel are closer to the target pixel than the third neighboring pixel and the fourth neighboring pixel; and
      diffuses error to at least one of the first, second, third and fourth neighboring pixels based on the determined ranking order of the first, second, third and fourth neighboring pixels.

21. The halftoning apparatus of claim 20, where the rank-order error diffusion unit resamples the processed image to an output resolution for the received grayed image if the processing resolution and the output resolution are not the same.

* * * * *